(12) United States Patent
Devic

(10) Patent No.: US 6,958,138 B1
(45) Date of Patent: Oct. 25, 2005

(54) SUPPORTED METAL CATALYST, PREPARATION AND APPLICATIONS FOR DIRECTLY MAKING HYDROGEN PEROXIDE

(75) Inventor: Michel Devic, Saint Foy les Lyon (FR)

(73) Assignee: Arkema, Puteaux (FR)

(*) Notice: Subject to any disclaimer, the term of this patent is extended or adjusted under 35 U.S.C. 154(b) by 61 days.

(21) Appl. No.: 10/018,868

(22) PCT Filed: Jun. 7, 2000

(86) PCT No.: PCT/FR00/01552

§ 371 (c)(1),
(2), (4) Date: Mar. 7, 2002

(87) PCT Pub. No.: WO01/05501

PCT Pub. Date: Jan. 25, 2001

(30) Foreign Application Priority Data

Jul. 16, 1999 (FR) .................................. 99 09260
Aug. 9, 1999 (FR) .................................. 99 10310

(51) Int. Cl.⁷ ............................................. C01B 15/01
(52) U.S. Cl. .................... 423/584; 502/302; 502/325; 502/339; 502/344
(58) Field of Search ................ 423/584, 588; 502/325, 339, 302, 344

(56) References Cited

U.S. PATENT DOCUMENTS

| | | | |
|---|---|---|---|
| 3,953,368 A * | 4/1976 | Sinfelt .......................... 502/223 |
| 4,154,751 A * | 5/1979 | McVicker et al. .......... 518/717 |
| 4,793,797 A | 12/1988 | Kato et al. |
| 4,847,231 A * | 7/1989 | Gratzel et al. ................ 502/74 |
| 5,128,114 A | 7/1992 | Schwartz |
| 5,135,731 A * | 8/1992 | Gosser et al. ................ 423/584 |
| 5,275,999 A * | 1/1994 | Tsurumi et al. .............. 502/339 |
| 5,378,699 A * | 1/1995 | Brunavs et al. ......... 514/212.08 |
| 5,536,693 A | 7/1996 | Lemanski et al. |
| 5,698,488 A * | 12/1997 | Birbara et al. ............... 502/325 |
| 5,853,693 A | 12/1998 | Ogasawara et al. |
| 6,024,807 A * | 2/2000 | Pappas et al. ............... 148/513 |
| 6,168,775 B1 * | 1/2001 | Zhou et al. .................. 423/584 |
| 6,197,720 B1 * | 3/2001 | Heineke et al. ............. 502/325 |
| 6,207,128 B1 * | 3/2001 | Sellin et al. ................. 423/588 |
| 6,288,295 B1 * | 9/2001 | Didillon et al. ............. 585/260 |
| 6,297,185 B1 * | 10/2001 | Thompson et al. ......... 502/101 |
| 6,372,688 B1 * | 4/2002 | Yamashita et al. .......... 502/326 |
| 6,387,346 B1 * | 5/2002 | Bertsch-Frank et al. .... 423/584 |

FOREIGN PATENT DOCUMENTS

JP 50-53333 5/1975

* cited by examiner

Primary Examiner—Wayne A. Langel
(74) Attorney, Agent, or Firm—Steven D. Boyd

(57) ABSTRACT

The invention concerns a supported metal catalyst based on at least one metal selected in the group M consisting of palladium, platinum, ruthenium, rhodium, iridium, holmium, osmium and gold, used for directly making hydrogen peroxide from hydrogen and oxygen. The invention also concerns a method for making said catalyst comprising successively an impregnating step with a solution based on one or several salt(s) of at least one metal of group M on a support, and a reduction step characterised in that at the end of the reduction step, the catalyst is treated with an aqueous acid solution comprising bromine and bromide ions. The catalyst is characterised by metal or crystallised metal aggregates with size ranging between 0.1 and 20 microns and preferably between 0.1 and 10 microns. The supported bimetal catalyst is preferred, for example Pd—Pt, Au—Pt, Pd—Ho and Pd—Au.

27 Claims, No Drawings

SUPPORTED METAL CATALYST, PREPARATION AND APPLICATIONS FOR DIRECTLY MAKING HYDROGEN PEROXIDE

The present invention relates to a supported metal catalyst suitable for the direct manufacture of hydrogen peroxide from hydrogen and oxygen. The subject of the invention is also the process for manufacturing the said catalyst and the process for manufacturing hydrogen peroxide using said catalyst.

The low productivity of the process for catalytic manufacturing of hydrogen peroxide directly from hydrogen and oxygen is an impediment to its development. There have been many attempts to improve this productivity. Mention may be made, for example, of U.S. Pat. No. 3,336,112, U.S. Pat. No. 3,361,533, U.S. Pat. No. 4,007,526, U.S. Pat. No. 4,009,252, U.S. Pat. No. 4,279,883 and U.S. Pat. No. 4,335,092. These studies are mainly based on a general concept, namely the stabilization of hydrogen peroxide using a sequestrate or a decomposition inhibitor.

Other ways of improving the hydrogen peroxide productivity of the direct process have also been explored. Thus, patent U.S. Pat. No. 4,379,778 discloses a process for the direct manufacturing of hydrogen peroxide from hydrogen and oxygen in an aqueous medium containing decomposition inhibitors in the presence of a palladium-carbon catalyst pretreated with an aldehyde or ketone and preferably also pretreated with a dilute hydrochloric acid solution.

The use of a bromide in the aqueous reaction mixture of the direct hydrogen peroxide manufacturing process is described in the patent U.S. Pat. No. 4,772,458.

Finally, patents U.S. Pat. No. 5,128,114 and U.S. Pat. No. 5,352,645 describe a method of preparing catalysts based on palladium or platinum-palladium supported on non-agglomerated uniform porous silica microspheres which are attrition-resistant thanks to the use of ammonia citrate or of urea as additive and are suitable for the direct manufacture of hydrogen peroxide.

Example 12 of patent U.S. Pat. No. 5,128,114 describes the preparation in two steps of a supported catalyst containing about 0.05% by weight of platinum and 1% by weight of palladium on porous silica microspheres. The support is firstly prepared by spray drying a mixture of Ludox AS 40 silica and urea, which is then calcined at 650° C. in nitrogen. This support is then added to a solution of Pt and Pd, prepared beforehand by dissolving $H_2PtCl_6$ and $PdCl_2$ in water, heated to a temperature of between 60 and 70° C. and acidified by concentrated HCl until a pH of about 1.2 is obtained. The resulting mixture is stirred, then spray dried and finally the powder obtained is reduced in a stream of hydrogen at 300° C.

The preparation of the supported catalyst according to Example 15 of patent U.S. Pat. No. 5,352,645 is similar to that described in Example 12 of patent U.S. Pat. No. 5,128,114 with, however, one difference. This is because the resulting mixture, instead of being spray dried, is vacuum dried at 100° C. overnight and then the dried solid is reduced in a stream of hydrogen at 100° C. Metal crystallites of the order of 30 to 50 Å were thus obtained.

The filing company has developed a supported catalyst based on at least one metal selected from the group M formed from palladium, platinum, ruthenium, rhodium, iridium, osmium, holmium and gold and, in particular, a supported bimetallic catalyst. In general the supported bimetallic catalyst consists of a majority metal from the group M and a minority metal from the group M. The majority metal represents about 0.1 to 10% by weight of the catalyst and preferably between 0.5 and 1% by weight. The minority metal represents about 0.001 to 0.1% by weight of the catalyst and preferably between 0.01 and 0.05%.

Palladium and gold are advantageously selected as the majority metal.

Platinum and holmium are advantageously selected as the minority metal.

The supported bimetallic catalyst particularly preferred consists of palladium as the majority metal and platinum as the minority metal.

The subject of the invention is also a supported multi-metal catalyst consisting of a majority metal from the group M and of several minority metals from the group M. The preferred supported multi-metal catalyst comprises palladium as the majority metal and platinum and at least one metal from the group M as minority metals.

The majority metal content in the supported multi-metal catalyst is virtually identical to that of the bimetallic catalyst and each minority metal may be present in the catalyst in an amount representing about 0.001 to 0.1% by weight of the catalyst and preferably between about 0.01 and 0.05%.

The present invention furthermore provides a supported single-metal catalyst with, preferably, platinum or gold as the metallic constituent of the group M. The content of metallic constituent is in general between 0.1 and 10% by weight of the catalyst and preferably between 0.5 and 1% by weight.

Preferably, the supported metal catalyst according to the invention is characterized by clusters of crystallized metal or metals having a size of between 0.1 and 20 μm and preferably between 1 and 10 μm.

Silica, alumina, carbon and aluminosilicates may be suitable as support. However, it is preferred to use silicate, and advantageously silica particles having a mean size of between 1 and 50 μm. It is also preferred to use silica having a BET specific surface area greater than 200 $m^2/g$ and usually between 300 and 600 $m^2/g$. Aldrich's microporous silica referenced 28,851-9 has proved to be particularly useful.

The amount of iron (Fe) in the chosen support is preferably less than 0.001% by weight.

A second subject of the invention is a process for preparing a supported catalyst based on at least one metal from the group M defined above. This process, comprising, in succession, a step of impregnating a solution based on one or more salts of at least one metal, selected from the group M on a support and a reduction step, is characterized in that, after the reduction step, the catalyst is subjected to a treatment with an aqueous acid solution (A) containing bromine and bromide ions.

According to the present invention, the concentration of bromide ions in the aqueous solution (A) may be between 20 and 200 mg/l and preferably between 20 and 100 mg/l. The concentration of bromine ($Br_2$) may be between 2 and 20 mg/l and preferably between 2 and 10 mg/l.

The pH of the aqueous solution (A) is preferably between 1 and 3.

The aqueous solution (A) may be prepared, for example, by dissolving an alkali or alkaline-earth metal bromide in water, then by adding bromine in bromine water form advantageously with a concentration close to 1% by weight and, finally, the pH may be adjusted using an acid. When the catalyst to be prepared comprises Pd, the solution (A) is made acid by sulfuric acid or phosphoric acid. Orthophosphoric acid ($H_3PO_4$) is however preferred.

The solution (A) particularly preferred contains about 100 mg/l of NaBr, 10 mg/l of $Br_2$ and 10 g/l of orthophosphoric acid.

In general, the process is carried out with a small amount of supported catalyst of between 5 and 50 g per liter of solution (A). An amount of catalyst close to 10 g per liter of solution (A) is preferred.

The treatment temperature is in general between 10 and 80° C. and preferably between 40 and 60° C.

The treatment time may vary between wide limits. This time may be between 1 and 12 hours and preferably between 4 and 8 hours.

After the treatment, the catalytic solid is separated from the aqueous solution (A) by any known means and then dried at a temperature of between 100 and 140° C. and preferably close to 120° C. Usually, the drying is carried out at atmospheric pressure, for example by means of a fan oven.

Impregnation of the support may be carried out by any known means. Advantageously, the impregnation step consists in bringing the chosen support into contact with the most concentrated possible aqueous solution of the salt or salts of at least one metal from the group M so as to form a slurry. This contacting step may be carried out by adding the concentrated aqueous solution of metal salt(s), at room temperature, to a mixer containing the support. The mixing time depends in general on the amount of support employed, but for productivity reasons it is preferred, after the metal solution has been added, to mix for about 0.5 to 3 hours.

After mixing and before the reduction step, the resulting slurry is preferably filtered, then drained and finally dried. To ensure maximum draining, it is recommended to carefully compress the filtered slurry. After draining, the impregnated support is dried preferably at a temperature of between 20 and 50° C. Advantageously, the drying is carried out under conditions conducive to slow crystallization and preferably in the absence of agitation. The drying time depends in general on the temperature and the pressure. It is usually between 1 and 7 days. As an indication in a vacuum oven heated to 40° C., 48 hours are enough to dry the impregnated and drained solid. The drying may also be carried out at room temperature for a week.

One particular method of preparing the supported catalyst based on at least one metal from the group M comprises, in succession, the following steps:

(a) bringing a support, selected from the group formed by silica, alumina, carbon and aluminosilicates, into contact with a concentrated aqueous solution of one or more salts of at least one metal from the group M so as to form a slurry;

(b) filtering, draining and then drying the slurry under conditions conducive to slow crystallization;

(c) reducing the solid dried in step (b);

(d) treating the solid reduced in step (c) with an aqueous acid solution (A) containing bromine and bromide ions; and (e) filtering the solid treated in step (d) and drying it at a temperature of between 100 and 140° C.

The preferred operating conditions for each step of the preparation are the same as those described above. With regard to the reduction step, the experimental conditions already used in the prior art, for example U.S. Pat. No. 5,128,114 and U.S. Pat. No. 5,352,645, may be applied.

Any known means for helping the metal salts to dissolve, so as to obtain a concentrated aqueous solution for the impregnation step (a), may be used. The use of a few drops of acid, slight heating and ultrasonic stirring may especially be mentioned.

It is preferred to grind the dried solid from step (b) before subjecting it to the reduction step. In practice, the oven used for the reduction is firstly purged with nitrogen for a sufficient time, generally 15 and 60 minutes, then flushed with hydrogen before being heated to a temperature of between 250 and 350° C. The solid reduction time at the chosen temperature may be between 1 and 3 hours. After reduction, the oven is returned to room temperature and then purged with nitrogen.

A third subject of the invention is the process for direct manufacture of hydrogen peroxide from hydrogen and oxygen. This process is characterized in that the catalyst described and prepared above is used.

The catalyst may be used in a process for the direct manufacture of hydrogen peroxide both in a tube reactor and in a stirred reactor. It is most particularly suitable for the process in which hydrogen and oxygen are injected into the aqueous reaction mixture in the stirred reactor and oxygen is introduced into the continuous gas phase in the stirred reactor.

Advantageously, the catalyst may be used in a direct hydrogen peroxide manufacturing process in which the hydrogen and oxygen are injected into the lower part of the aqueous reaction mixture and oxygen is introduced into the continuous gas phase in the stirred reactor in an amount such that the composition of this continuous gas phase is outside the flamability range.

The catalyst has proved to be very beneficial when the stirred reactor is provided with several turbines arranged along a single vertical axis. When the hydrogen and oxygen are injected in the form of small bubbles into the lower part of the aqueous reaction mixture in proportions such that the ratio of the hydrogen molar flow rate to the oxygen molar flow rate is greater than 0.0416, a higher hydrogen peroxide productivity than that in the prior art is obtained.

The catalyst has proved to be particularly beneficial in a continuous direct hydrogen peroxide manufacturing process with recycling of the reactants, such as hydrogen.

EXPERIMENTAL PART

Preparation of the Catalysts

Example 1

The following were added at room temperature into 50 $cm^3$ of demineralized water:

0.33 g of $PdCl_2$ (Aldrich reference: 20,588- 5);

0.021 g of $H_2PtCl_6$ (Aldrich reference: 25,402-9);

and a few drops of 30% by weight of HCl in order to aid dissolution;

20 g of microporous silica Aldrich (reference 28,851-9) having the following characteristics:

| | |
|---|---|
| mean particle size: | 25 µm |
| BET surface area: | 500 $m^2/g$ |
| pore volume: | 0.75 $cm^3/g$ |
| mean pore diameter: | 60 Å | were placed in a glass beaker, stirred using a bar magnet. 50 $cm^3$ of the metal salt solution prepared above were then rapidly added.

After stirring for 1 hour 30 minutes at 25° C., a thick stock was obtained, which was filtered over a No. 3 glass frit and vacuum drained for 2 hours 30 minutes. The filter cake was placed in a crystallizer over a glass cloth and dried for 48 hours at 40° C. in a vacuum oven. Next, the dried solid was reduced in a stream of 60 Nl/h of $H_2$ at 300° C. for 1 hour 30 minutes and then cooled to room temperature over 6 hours.

The reduced solid was then treated at 40° C. for 5 hours with 2000 cm$^3$ of a solution containing 100 mg/l of NaBr, 10 mg/l of $Br_2$ and 10 g/l of $H_3PO_4$.

Next, the resulting mixture was filtered and the catalyst dried for 24 hours in a fan oven at 120° C.

After analysis the catalyst contained 0.7% Pd and 0.03% platinum by weight.

Example 2

The procedure was as in Example 1, with the sole difference that the reduced solid was used directly as a catalyst without treatment with the aqueous brominated solution.

Example 3

After the silica was impregnated in Example 1, instead of filtering the stock and draining the filtered slurry, the stock was dried in a laboratory rotary evaporator (Heidolph with a 500 cm$^3$ fluted round-bottomed glass flask). The flask was rotated in an oil bath at 120° C. in a vacuum of 40 mmHg. After evaporation, the solid was reduced and then treated as described in Example 1.

Example 4

The procedure was as described in Example 3 except that the solid after reduction was not treated with the aqueous brominated solution.

Example 5

The procedure was as described in Example 3 except that after impregnation the stock was left in the ambient air for 1 week instead of being dried in the rotary evaporator.

Example 6

The procedure was as described in Example 1 except that the Pd was replaced with Au.

Example 7

The procedure was as described in Example 1 except that the Pt was replaced with Ho.

Example 8

The procedure was as described in Example 1 except that the Pt was replaced with Au.

Preparation of the Hydrogen Peroxide Solution
General Operating Method

A chosen amount of aqueous reaction mixture and catalyst was introduced into a cylindrical reactor, having a total capacity of 1500 cm$^3$, fitted with two or three flanged turbines 45 mm in diameter, with 4 vertical baffles and with a bundle of cooling tubes.

The aqueous reaction mixture was prepared by adding 12 g of $H_3PO_4$, 58 mg of NaBr and 5 mg of $Br_2$ in 1000 cm$^3$ of demineralized water.

The reactor was pressurized by injecting oxygen into the continuous gas phase with a chosen flow rate. The pressure was kept constant by means of a pressure regulator. The liquid medium was raised to the chosen temperature by the circulation of thermostated water through the bundle of cooling tubes.

The stirring was set at 1900 rpm and oxygen and hydrogen were injected into the liquid phase at the center of the bottom turbine with chosen flow rates.

The flow rate and the hydrogen content of the gas mixture leaving the pressure regulator were measured. After the anticipated reaction time had elapsed, the feed of hydrogen and oxygen into the aqueous reaction mixture was cut and the injection of oxygen into the continuous gas phase was continued until the hydrogen in the latter disappeared. The oxygen fed was then cut and the reactor decompressed.

The aqueous hydrogen peroxide solution was weighed and separated from the catalyst by filtration over a Millipore® filter.

This solution was then assayed by iodometry in order to determine the $H_2O_2$ concentration. The $H_2O_2$ selectivity is defined as a percentage of the ratio of the number of moles of $H_2O_2$ formed to the number of moles of $H_2$ consumed.

The degree of conversion is defined as being the percentage of ratio of the volume of $H_2$ consumed to the volume of $H_2$ injected.

The catalyst results for each trial are summarized in Table I.

TABLE I

| | | REACTION MIXTURE | | REACTION CONDITIONS | | | | | | RESULTS | | |
| | | | | | | $H_2$ injected | $O_2$ injected | $O_2$ injected | | | | | |
| | | | WORKING | | | into the | into the | into the | | | | | |
| Trial No. | Catalyst example | CATALYST Weight (g) | SOLUTION Weight (g) | P (bar) | Reaction Temp. (° C.) | liquid phase (Nl/h) | liquid phase (Nl/h) | gas phase (Nl/h) | Number of turbines | Time (h) | $H_2O_2$ (%) | $H_2O_2$ selectivity | $H_2$ Conversion (%) |
|---|---|---|---|---|---|---|---|---|---|---|---|---|---|
| 1 | 1 | 6 | 700 | 50 | 20 | 80 | 188 | 1760 | 2 | 3 | 17.5 | 97 | 42.0 |
| 2 | 1 | 6 | 700 | 50 | 20 | 80 | 188 | 1760 | 2 | 3 | 17.4 | 96 | 42.0 |
| 3 | 2 | 6 | 700 | 50 | 20 | 80 | 188 | 1760 | 2 | 3 | 16.2 | 85 | 45.0 |
| 4 | 3 | 6 | 700 | 50 | 20 | 80 | 160 | 1760 | 2 | 3 | 16.3 | 84 | 45.8 |
| 5 | 4 | 6 | 700 | 50 | 20 | 80 | 160 | 1760 | 2 | 3 | 15.4 | 82 | 44.0 |
| 6 | 1 | 6 | 700 | 50 | 41.2 | 120 | 240 | 2640 | 2 | 1 | 12.2 | 90 | 60.2 |

TABLE I-continued

| | | REACTION CONDITIONS | | | | | | | | | | | |
|---|---|---|---|---|---|---|---|---|---|---|---|---|---|
| | | REACTION MIXTURE | | | | $H_2$ injected into the liquid phase (Nl/h) | $O_2$ injected into the liquid phase (Nl/h) | $O_2$ injected into the gas phase (Nl/h) | | | RESULTS | | |
| Trial No. | Catalyst example | CATALYST Weight (g) | WORKING SOLUTION Weight (g) | P (bar) | Reaction Temp. (° C.) | | | | Number of turbines | Time (h) | $H_2O_2$ (%) | $H_2O_2$ selectivity | $H_2$ Conversion (%) |
| 7 | 5 | 6 | 700 | 50 | 41.5 | 120 | 240 | 2640 | 3 | 1 | 12.4 | 86 | 64.3 |
| 8 | 1 | 8.5 | 1000 | 50 | 39.8 | 120 | 240 | 2640 | 3 | 1 | 10.6 | 90 | 72.5 |
| 9 | 6 | 8.5 | 1000 | 50 | 40.5 | 120 | 240 | 2640 | 3 | 1 | 6.4 | 54 | 71.6 |
| 10 | 7 | 8.5 | 1000 | 50 | 39.5 | 120 | 240 | 2640 | 3 | 1 | 7.8 | 76 | 61.6 |
| 11 | 8 | 8.5 | 1000 | 50 | 40 | 120 | 240 | 2640 | 3 | 1 | 7.9 | 73 | 65.6 |

What is claimed is:

1. A process for preparing a supported metal catalyst, comprising:
   (a) impregnating a support with a solution of a salt of a metal selected from the group consisting of palladium, platinum, ruthenium, rhodium, iridium, osmium, holmium and gold;
   (b) subjecting the impregnated support to a reduction process; and
   (c) treating the impregnated support obtained in step (b) with an aqueous acid solution containing bromine and bromide ion.

2. The process of claim 1, wherein the concentration of bromide ions in the aqueous acid solution is between about 20 mg/l and about 200 mg/l.

3. The process of claim 1, wherein the concentration of bromide ions in the aqueous acid solution is between about 20 mg/l and about 100 mg/l.

4. The process of claim 1, wherein the concentration of bromine in the aqueous acid solution is between about 2 mg/l and about 20 mg/l.

5. The process of claim 1, wherein the concentration of bromine in the aqueous acid solution is between about 2 mg/l and about 10 mg/l.

6. The process of claim 1, wherein the pH of the aqueous acid solution is between about 1 and about 3.

7. The process of claim 1, wherein step(c) is conducted at a temperature between about 10° C. and about 80° C.

8. The process of claim 7, wherein the temperature is between about 40° C. and about 60° C.

9. The process of claim 1, wherein, the impregnated support obtained in step (c) is separated from the aqueous acid solution and dried at a temperature between about 100° C. and about 140° C.

10. The process of claim 9, wherein, a slurry is obtained in step (a), which is filtered, drained and then dried before step (b).

11. The process of claim 10, wherein the drying is carried out under conditions conducive to slow crystallization.

12. The process of claim 1, wherein the metal-salt solution comprises two kinds of metal salts so that a supported bimetallic catalyst is obtained.

13. The process of claim 12, wherein the two kinds of metal salts are a majority metal salt and a minority metal salt, and the bimetallic catalyst comprises about 0.001% to about 0.1% by weight minority metal based on the weight of the bimetallic catalyst.

14. The process of claim 12, wherein the metal-salt solution contains salts of palladium and gold.

15. The process of claim 12, wherein the minority metal is platinum.

16. The process of claim 1, wherein the support is a silica having a BET specific surface area.

17. The process of claim 15, wherein the BET specific surface is greater than 200 $m^2$/g.

18. A supported metal catalyst, which comprises a support and a metal selected from the group consisting of palladium, platinum, ruthenium, rhodium, iridium, osmium, holmium and gold, wherein the metal is disposed on the support in a form of cluster of crystals, and wherein the size of the cluster is between about 0.1 μm and about 20 μm.

19. The catalyst of claim 18, wherein the size of the cluster is between about 0.1 μm and about 10 μm.

20. The catalyst of claim 18, wherein the supported metal catalyst contains about 0.1% to about 10% by weight based on the weight of the catalyst.

21. The catalyst of claim 18, which is a supported bimetallic catalyst comprising two kinds of metals.

22. A The catalyst of claim 21, wherein the two kinds of metals are a majority metal and a minority metal, and said catalyst contains about 0.001% to about 0.1% minority metal by weight based on the weight of the catalyst.

23. The catalyst of claim 21, wherein the metals are palladium and gold.

24. The catalyst of claim 21, wherein the minority metal is platinum.

25. The catalyst of claim 18, wherein the support is a silica having a BET specific surface area.

26. The catalyst of claim 25, wherein the BET specific surface is greater than 200 $m^2$/g.

27. A process for manufacturing hydrogen peroxide, wherein conducting a direct reaction between hydrogen and oxygen using the supported metal catalyst of claim 18.

* * * * *